United States Patent
Greenstein (12)

(10) Patent No.: US 6,266,692 B1
(45) Date of Patent: Jul. 24, 2001

(54) METHOD FOR BLOCKING ALL UNWANTED E-MAIL (SPAM) USING A HEADER-BASED PASSWORD

(75) Inventor: Bret A. Greenstein, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/225,473

(22) Filed: Jan. 4, 1999

(51) Int. Cl.$^7$ .................................................. G06F 13/00
(52) U.S. Cl. .............................................. 709/206; 709/307
(58) Field of Search .................................. 709/206, 207, 709/315

(56) References Cited

U.S. PATENT DOCUMENTS

| | | | |
|---|---|---|---|
| 5,635,918 | * 6/1997 | Tett | 340/825 |
| 5,999,932 | * 12/1999 | Paul | 709/206 |
| 6,047,310 | * 4/2000 | Kamakura et al. | 709/201 |
| 6,073,165 | * 6/2000 | Narasimhan et al. | 709/206 |

* cited by examiner

Primary Examiner—Robert B. Harrell
(74) Attorney, Agent, or Firm—Scully, Scott, Murphy & Presser; Richard M. Kotulak, Esq.

(57) ABSTRACT

A method for blocking and/or filtering electronic mail. Selected senders are provided with a valid passcode associated with an e-mail address. When an e-mail is received at a mail server node, a field in a header of the e-mail is checked for a valid passcode associated with the destination e-mail address. If a valid passcode is detected, the e-mail is automatically sent to a receiver at the e-mail address. If an incorrect passcode is detected, the e-mail is automatically deleted at the server node and does not reach the receiver. If there is no passcode in the e-mail header, the e-mail is held temporarily, until the receiver approves to receive the e-mail. If the receiver rejects the e-mail, the e-mail is deleted. The present invention includes an additional capability for the senders of e-mails to request a passcode associated with a specific e-mail address in a lookup directory, before sending an e-mail to that address. Furthermore, the present invention enables firewall servers to block incoming e-mails only if they are received from the public Internet, thereby allowing all internal e-mails to reach the receiver without having to include valid passcodes.

16 Claims, 4 Drawing Sheets

METHOD FOR BLOCKING ALL UNWANTED E-MAIL (SPAM) USING A HEADER-BASED PASSWORD

TECHNICAL FIELD

The present invention relates in general to data processing, and more particularly to a system and a method for filtering incoming electronic mail.

PRIOR ART

The Internet is growing in popularity, and more and more people are conducting business over the Internet, advertising their products and services by generating and sending electronic mass mailings. These electronic mail (e-mail) are usually unsolicited and regarded as nuisances by the recipients because they occupy much of the storage space needed for the necessary and important data processing. For example, a mail server may have to reject accepting an important and/or desired e-mail when its storage capacity is filled to the maximum with the unwanted e-mail containing advertisements. Moreover, thin client systems such as set top boxes, PDA's, network computers, and pagers all have limited storage capacity. Unwanted mail in any one of such systems can tie up a finite resource for the user. In addition, a typical user wastes time by downloading voluminous but useless advertisement information. For example, many mobile and home users are still limited to 28.8K–56K connection speeds. Unwanted mail typically slows down users by forcing the mail to be downloaded when the mail is delivered. Because this type of mail is so undesirable, it has acquired a special name in the Internet community, SPAM.

Therefore, it is highly desirable to have a filter system for screening and turning away unwanted mails, while the desired e-mails pass through the system to reach the recipients. Presently, there are products that are capable of filtering out unwanted messages. For example, Qualcomm's Eudora Pro e-mail program can select e-mail and delete before reading on the basis of an unlimited set of user-specified character sequences, whether those sequences appear in a message's subject, in the main body of the text, or as part of the sender's name.

A SPAM block method also exists which keeps an index list of all SPAM agents, i.e., companies that generate mass unsolicited e-mails, and provides means to block any e-mail sent from a company on the list. A problem associated with this method is that it has no capability of screening new SPAM agents which are not on the list. Identifying the new SPAM agents and keeping the list up-to-date may prove to be expensive and not readily affordable.

Another "junk mail" filter currently available employs filters which are based on predefined words and patterns as mentioned above. An incoming mail is designated as an unwanted mail, if the subject contains a known SPAM pattern. If it is returned to a sender, the return message describes the pattern that was identified, while providing a passcode which can be used to resend the message so it will pass through the filter.

Yet another e-mail service forwards all incoming e-mail to another address, filtering SPAM sender addresses. A master junk mail file is used to filter incoming e-mail against a list of known "spammers." In addition, a custom filter which is defined by a user may also be employed as a double filter to discard any unwanted e-mail.

The problem associated with the currently available filters is that if an unwanted mail does not contain a specific pattern or if sender's address is not in the list of spam agents, the mail can reach the recipient. Since the cost of sending out spam is so much smaller than the costs associated with paper mail, it is likely that people will continue to send spam. With the existing methods, new spam agents always get through until the list gets updated to include them. In addition, the database of spam agents will continue to grow and will introduce adverse system impact for the client or the server. Therefore, it is highly desirable to have an e-mail filter system which can always block unwanted mail, even as new spam agents emerge, without compromising system resources.

SUMMARY OF THE INVENTION

Accordingly, to resolve the above shortcomings, the present invention provides a blocking process which requires that all senders be pre-approved before they can send an e-mail to a recipient. With the present invention, the incoming mail which does not contain a user-defined "passcode" may be blocked at the server.

The mechanism of the present invention provides a user with a private mailbox despite the fact that the user's e-mail address or pager identification is well known.

The present invention enables the user, i.e., a would be recipient, to provide a "passcode" to all potential senders. The passcode may be a phrase which the user defines and sends to all welcome e-mail participants. The user would maintain a distribution list of valid senders to which the user can send an updated passcode easily. The passcode may either be an ASCII character stream, or a randomly generated binary "key." When sending an e-mail, a sender must specify the passcode which was provided by the recipient and which is inserted in a predefined field in a mail header. Any mail without a correct passcode identified as part of a mail header may not be delivered to the recipient. Unapproved mail, therefore, will be deleted, stored in a predefined storage space until deleted or approved, or returned to the sender by the processing mail server. The present invention enables blocking of unsolictied advertisers, and allows recipients of e-mail to change the passcode and easily prevent previously approved senders from continuing to send e-mail.

When distributing the passcode, a common passcode may be assigned to all senders, or alternately, individual passcodes may be given to each sender and kept on a virtual key-ring. The passcodes may be changed for individuals at any time, thereby preventing any one of the senders from writing to the recipient in the future.

The e-mail without valid passcodes may either be deleted or stored temporarily. In the latter case, an approval request to the recipient will be initiated to verify the rejection of the e-mail. Moreover, all e-mail sent within an intranet or inside a firewall may be configured to pass through the mail server even without appropriate passcodes. This isolation method allows all users inside a firewall to have open access to send mail, and is useful when there are no unwanted advertiser within the firewall.

In addition, the present invention provides for the senders of the e-mail to request approval to send, e.g., request a valid passcode of the recipient, before sending the e-mail, thereby preventing senders from writing the e-mail first only to find that it is rejected.

To provide the above functionalities, the present invention includes an e-mail client with passcode management capability, an e-mail server with ability to check passcodes, ability to process optional authorization requests, firewall server or mail gateway that can block Internet mail while allowing internal mail, and a passcode request tool for e-mail directories.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Present invention is directed to a system and method for blocking unwanted e-mail, i.e., SPAM. The implementation generally requires enhancements to the known mail servers such as the Post Office Protocol version 3 (POP3) or Internet Mail Access Protocol, version 4 (IMAP4), and additional enhancements to the mail client code for the user. Any existing mail servers may easily adopt the method of the present invention for blocking unwanted e-mail.

Figure 1:
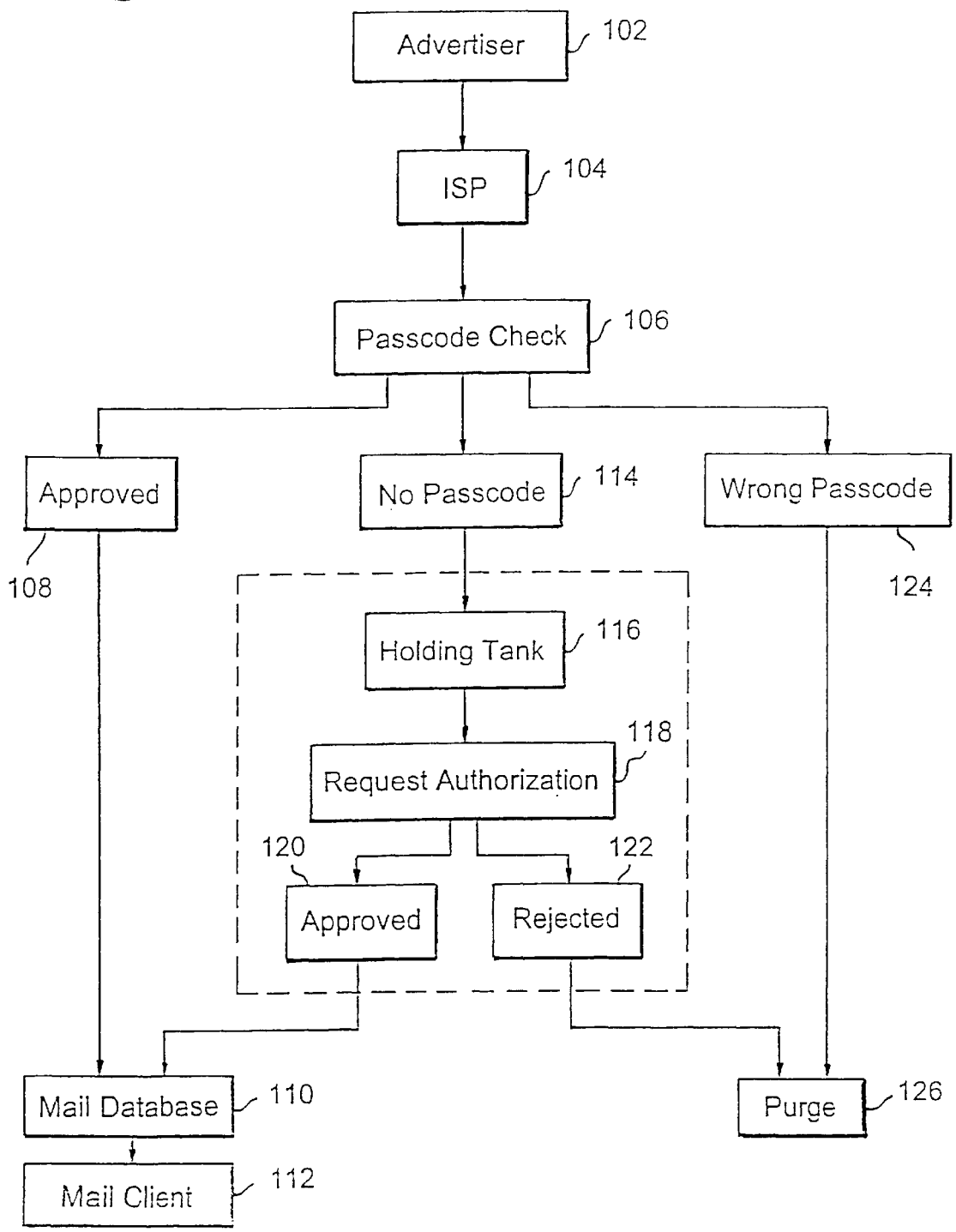
FIG. 1 is a flow diagram illustrating a logical flow of the present invention.

FIG. 1 is a flow diagram illustrating a logical flow of the present invention. An advertiser at step 102 sends advertisement e-mails via an Internet service provider (ISP) at step 104. The ISP typically provides the e-mail services via its e-mail server. The e-mail server includes a functionality to check passcodes of all e-mails destined for a specific user configured for the SPAM blocking of the present invention. Accordingly, at step 106 the e-mail server checks the incoming e-mail's passcode against the user's passcode. If the passcode matches the user's passcode, the e-mail server approves the e-mail at step 108 and sends the e-mail to the mail database having the user's mail inbox at step 110. At step 112, the user may then retrieve the e-mail from the database via the mail client.

At step 114, if a sender did not specify a passcode when sending to the user who requires such passcode, the server stores the e-mail in a temporary storage, i.e., a holding tank, at step 116. At step 118, the server transmits an authorization request to the user via the mail client, to either accept or reject the e-mail. If the user approves the e-mail at step 120, the e-mail is placed in the mail database at step 110, making it available to the mail client to retrieve at step 112. On the other hand, if the user rejects the e-mail at step 122, the e-mail is deleted at step 126. At step 124, if a sender includes a wrong passcode with the e-mail destined for the user, the e-mail server deletes the e-mail at step 126. When the unwanted e-mail is purged, the server may additionally send a reply e-mail back to the sender to not send anymore unwanted e-mails to this user. Alternately, the unwanted mail may be sent back to the sender.

Figure 2:
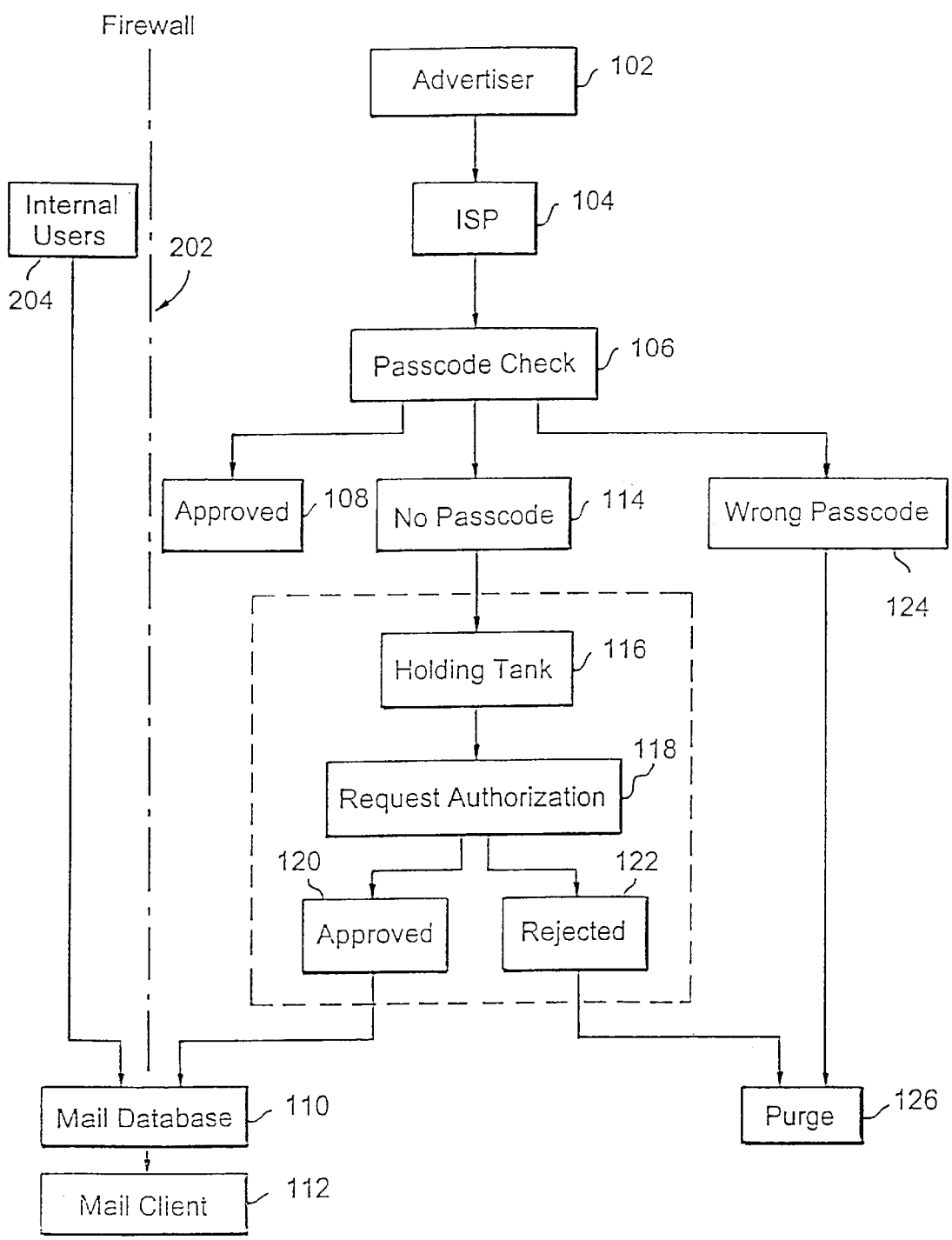
FIG. 2 illustrates a logic flow diagram of the present invention when it is used in an Internet/Intranet environment.

The present invention may also be used within an Internet/Intranet environment where the user may desire to receive all internal e-mails regardless of passcodes. FIG. 2 illustrates a logic flow of the present invention when it is used in an Internet/Intranet environment. The internal e-mail from the users 204 within a company separated from the public Internet by a Firewall 202 may be configured to arrive at the destination without having to include the passcode. This mechanism allows all users inside a Firewall 202 to have an open access to send mail. As shown in FIG. 2, the e-mail sent by the internal users at step 204 are directly placed into the mail database at step 110 without performing the necessary steps to validate the passcode. This is useful if there are no unwanted advertisers within the Firewall 202. An enhancement to existing Firewall server or mail gateway will be able to block Internet mail while allowing internal mail to reach the destination address.

Figure 4:
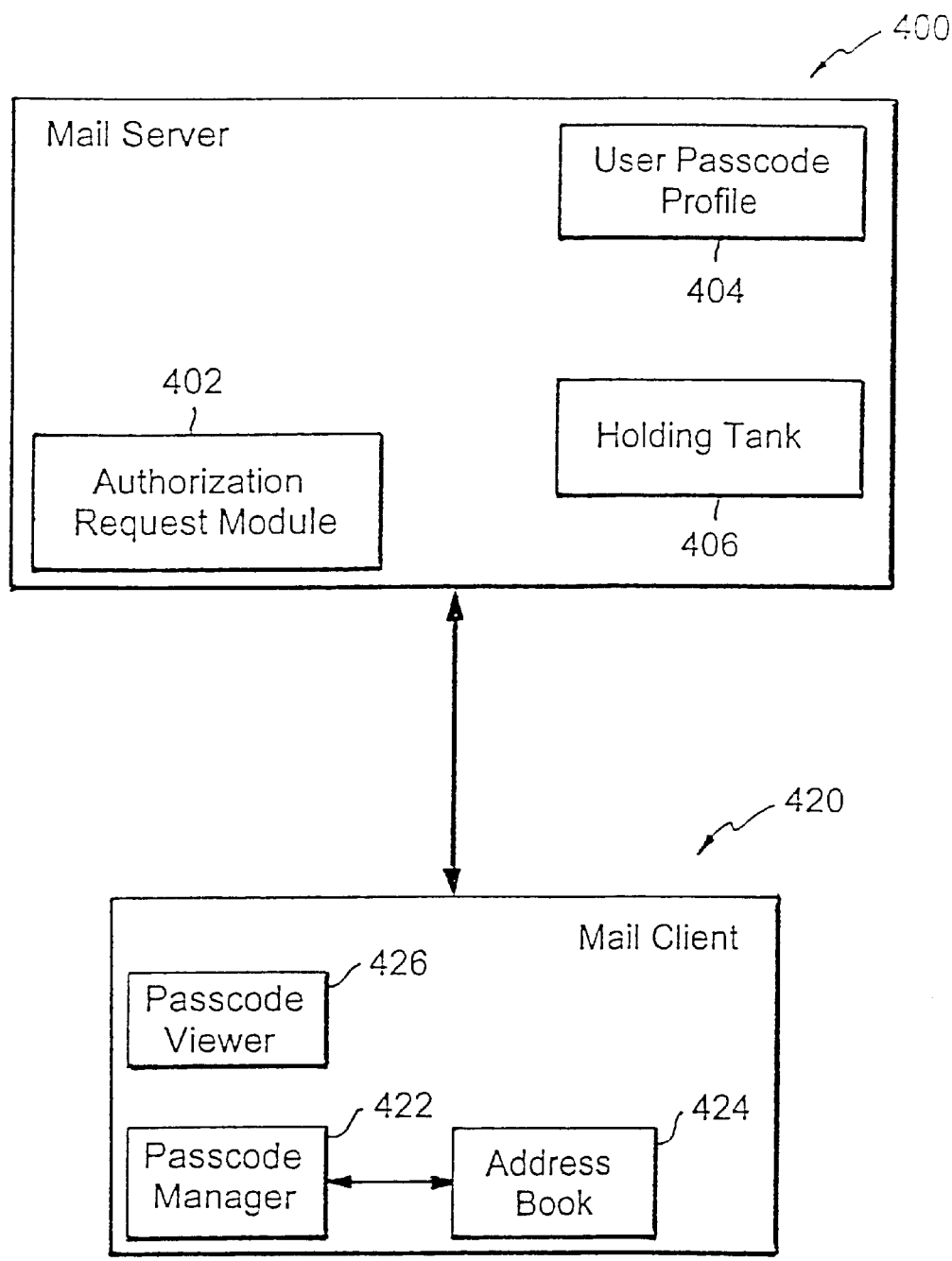
FIG. 4 illustrates a mail server and a mail client components of the present invention.

FIG. 4 illustrates some of the components of the system of the present invention. In order to provide the above described functionality, the e-mail server 400 includes a passcode profile 404 for each user who is configured for the SPAM blocking service. In addition, the incoming e-mail header needs to include a header field reserved for the passcode. The e-mail server compares this header field with the passcode profile 404 for the user when validating the passcode.

Figure 3:
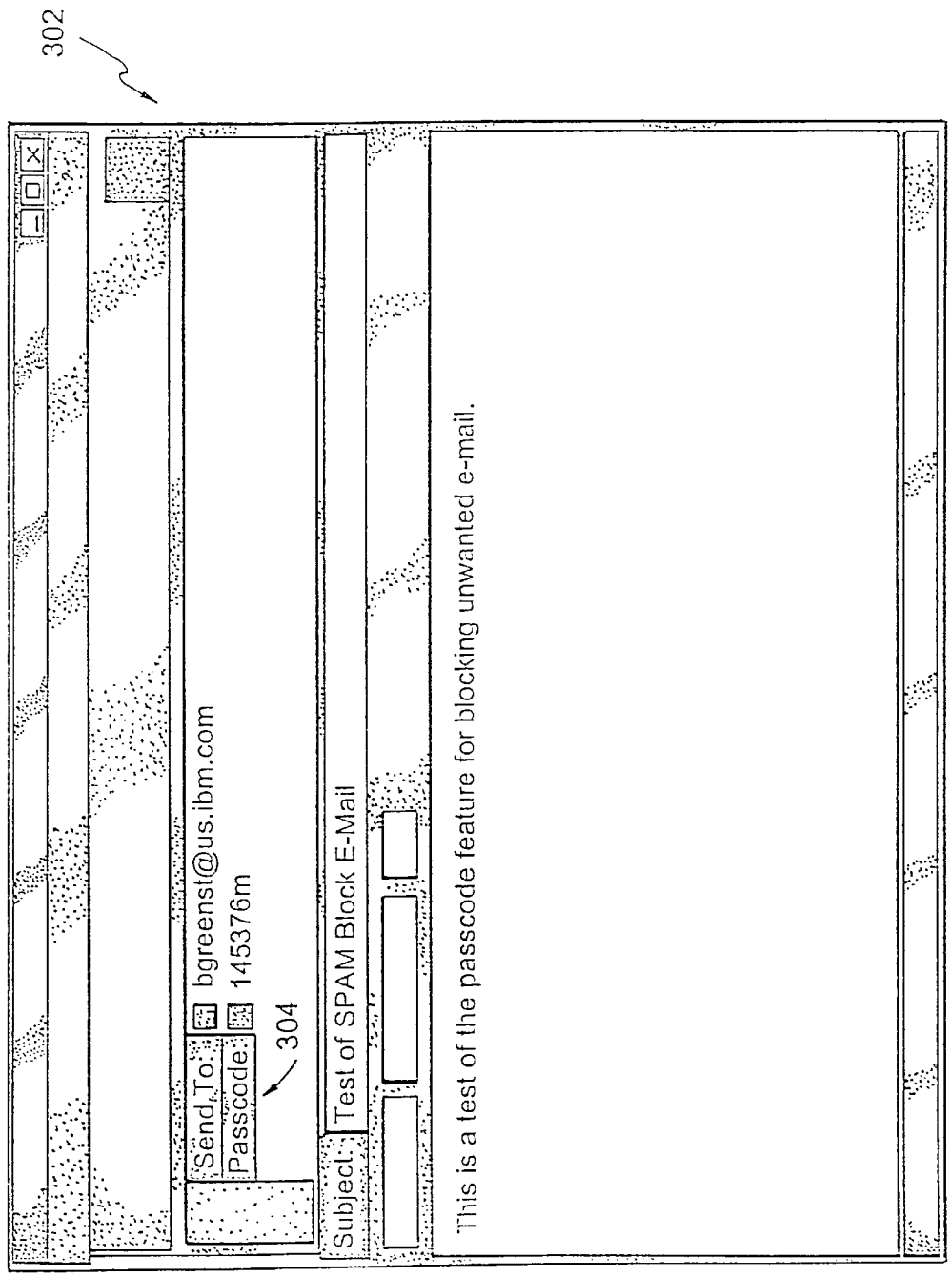
FIG. 3 illustrates an example of a sample e-mail page including the passcode field.

The e-mail client 420 is configured to support an additional passcode field. This field is similar to, e.g., TO, FROM, CC, SUBJECT fields. An example of a sample e-mail page 302 including the passcode field 304 is shown in FIG. 3. In addition, referring back to FIG. 4, the mail client 420 may include a passcode managing capability 422 for the senders of e-mail as well as recipients. For example, passcodes may be stored in an address book 424 along with the e-mail addresses, allowing approved senders to send e-mail without having to type in the passcode each time. Moreover, the mail client 420 may include a viewing capability 426 to show the passcodes assigned or used. The mail client 420 also may include a capability to send a passcode profile including a list of passcodes specified by the user to the mail server 400 at anytime, thus allowing near real-time updates of passcodes associated with the user.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what I claim as new, and desire to secure by Letters Patent is:

1. A method of filtering electronic mail (e-mail) transmitted by a sender to a servicing node and destined for receipt by a receiver comprising the steps of:

scanning a header associated with the e-mail at the servicing node for both a destination address and a destination passcode, said destination passcode being a binary key included in a predefined field of said header reserved for passcodes;

determining whether the destination address and the destination passcode match a receiver's address and a receiver's passcode; and automatically providing the e-mail matching both the receiver's passcode and the receiver's address to the receiver.

2. The method as claimed in claim 1, wherein the method further includes the step of:

warehousing the mail which includes the receiver's address, but not the receiver's passcode, wherein the receiver may access the mail when desired.

3. The method as claimed in claim 2, wherein the method further includes the steps of:

requesting from the receiver an authorization to send the mail which includes the receiver's address, but not the receiver's passcode;

sending the mail to the receiver if the receiver approves the authorization to send.

4. The method as claimed in claim 3, wherein the method further includes the steps of:

deleting the mail if the receiver rejects the authorization to send.

5. The method as claimed in claim 1, wherein the method further includes the step of:

deleting the mail which includes a passcode which does not match the receiver's passcode.

6. The method as claimed in claim 5, wherein the method further includes the step of:

sending a reply message to the sender of the mail which includes a passcode which does not match the receiver's passcode, the reply message for informing the sender not to send any more e-mails to the receiver.

7. The method as claimed in claim 1, wherein the method further includes:

providing selected senders of e-mail with the receiver's passcode for placement in an e-mail header of an e-mail message along with the receiver's address.

8. The method as claimed in claim 1, wherein the method further includes the step of:

enabling a sender to request a passcode of an e-mail address before sending an e-mail; and allowing the sender to send an e-mail to the receiver when the request is approved, by providing the passcode for inclusion with the e-mail.

9. The method as claimed in claim 1, wherein the method further includes the step of:

communicating a list of valid passcodes associated with the receiver to the servicing node.

10. The method as claimed in claim 1, wherein the method further includes the step of:

storing a passcode associated with an e-mail address in an address book at a client node; and automatically placing the passcode in a header of a note when sending the note to the e-mail address.

11. The method as claimed in claim 1, wherein the method further includes the step of:

allowing all e-mail originating inside a firewall to be sent to the receiver without scanning for the receiver's passcode.

12. A system for filtering electronic mail (e-mail) transmitted by a sender and destined for receipt by a receiver comprising:

a server for scanning a header field of an incoming e-mail for a destination address and a destination passcode, said destination passcode being a binary key included in a predefined field of said header reserved for passcodes, and for determining whether said destination passcode associated with said destination address of the e-mail matches a particular mail client's password and said destination address matches a particular mail client's address; and said mail client being enabled for receiving the e-mail from the server, wherein the server sends only those e-mail with matching passcodes to the mail client.

13. The system as claimed in claim 12, wherein the server further includes:

a holding tank for temporarily storing mail without a passcode specified in its header field; and an authorization device for requesting from the mail client, an approval to send the mail without a passcode specified in its header field, wherein upon approval from the mail client, the server sends the mail to the client, and upon rejection from the mail client, the server deletes the mail from the holding tank.

14. The system as claimed in claim 12, wherein the mail client further includes:

a passcode manager for managing an address book to include passcodes associated with electronic mail addresses listed in the address book.

15. An article of manufacture comprising a computer usable medium having computer readable program code embodied therein for filtering electronic mail (e-mail), the computer readable program code in the article of manufacture comprising:

computer readable program code for causing a computer to scan the e-mail header at the servicing node for both the destination address and a destination passcode, said destination passcode being a binary key included in a predefined field of said header reserved for passcodes;

computer readable program code for causing a computer to determine whether the destination address and the destination passcode match a receiver's address and a receiver's passcode; and computer readable program code for causing a computer to automatically provide the e-mail matching both the receiver's passcode and the receiver's address to the receiver.

16. An article of manufacture comprising a computer usable medium having computer readable program code embodied therein for filtering mail as claimed in claim 15, the computer readable program code in the article of manufacture further comprising:

computer readable program code for causing a computer to determine whether the mail originated from inside an Intranet or the mail is incoming from the public Internet, wherein the mail originating from inside an Intranet is communicated to its destination regardless of presence of a passcode.

* * * * *